(12) United States Patent
Dudek

(10) Patent No.: US 8,025,235 B2
(45) Date of Patent: Sep. 27, 2011

(54) PROGRESSIVELY DEGRADING SYNTHETIC MARKERS

(75) Inventor: Gregory Dudek, Westmount (CA)

(73) Assignee: The Royal Institution for the Advancement of Learning/McGill University, Montreal (CA)

( * ) Notice: Subject to any disclaimer, the term of this patent is extended or adjusted under 35 U.S.C. 154(b) by 533 days.

(21) Appl. No.: 12/122,078

(22) Filed: May 16, 2008

(65) Prior Publication Data

US 2008/0296390 A1    Dec. 4, 2008

Related U.S. Application Data

(60) Provisional application No. 60/924,499, filed on May 17, 2007.

(51) Int. Cl.
*G06K 7/12* (2006.01)
(52) U.S. Cl. .......... 235/469; 235/494; 235/454
(58) Field of Classification Search .......... 235/469, 235/454, 462.04, 494
See application file for complete search history.

(56) References Cited

U.S. PATENT DOCUMENTS

| | | | |
|---|---|---|---|
| 5,949,055 A | 9/1999 | Fleet et al. | |
| 6,556,689 B1 | 4/2003 | Xia et al. | |
| 6,688,525 B1 | 2/2004 | Nelson et al. | |
| 6,789,042 B2 | 9/2004 | Boyton | |
| 2004/0015323 A1 | 1/2004 | Boyton | |
| 2004/0177003 A1 | 9/2004 | Liao et al. | |
| 2006/0265281 A1 | 11/2006 | Sprovieri et al. | |
| 2007/0007348 A1 | 1/2007 | Shah | |

FOREIGN PATENT DOCUMENTS

| | | |
|---|---|---|
| DE | 10055544 | 10/2001 |
| JP | 2006279521 | 10/2006 |

OTHER PUBLICATIONS

Story, Louise: "New Bar Codes Can talk With Your Cellphone", A Film by Mira Nair, Apr. 1, 2007.

*Primary Examiner* — Edwyn Labaze
(74) *Attorney, Agent, or Firm* — Norton Rose Or LLP

(57) ABSTRACT

There is described a synthetic marker encoding data, the synthetic marker comprising an information payload represented by bits encoded along a spectrum, each of the bits having a priority level assigned thereto ranging from high to low, bits having lower priority levels being encoded along an end of the spectrum which is successively lost with progressively degrading marker viewing conditions compared to bits having higher priority levels.

24 Claims, 15 Drawing Sheets

Pixel location

Frequency

Original marker

Partially degraded image

Degraded image

PROGRESSIVELY DEGRADING SYNTHETIC MARKERS

CROSS-REFERENCE TO RELATED APPLICATIONS

This application claims priority of U.S. Provisional Patent Application No. 60/924,499, filed on May 17, 2007, the contents of which are hereby incorporated by reference.

TECHNICAL FIELD

The present invention relates to the field of synthetic markers and more particularly to markers used to visually encode multi-bit information for subsequent detection.

BACKGROUND OF THE INVENTION

Synthetic markers are used to provide visual cues that are easy to detect for computer vision systems. Such markers can be used in robotics, automation and media-oriented applications such as advertising, coupon redemption, nutrition information on packaging, etc to encode a symbolic label (i.e. a number). An example of a synthetic marker is a bar-code. Other examples of general purpose synthetic markers and related encoding schemes are the US Postal Service's Maxi-Code™ as illustrated in FIG. 1a, which is used to encode shipping information in packages. QuickResponse™ and Data Matrix™ as illustrated in FIG. 1b is used for carrying information for part labeling.

A sub-class of synthetic markers are fiducial or fiduciary markers. Fiducial markers are synthetic markers which are better adapted to provide visual cues for positioning an object in space. These markers can thus be used to provide position estimates for robotics applications. They can also be used to label individual objects for their manipulation or for scene augmentation purposes in the field of augmented reality.

Some encoding methods used to create synthetic markers involve error correction schemes which allow for some recovery of encoded information in case part of the information retrieved from the marker is corrupted. Such encoding methods tend to produce markers which are however limited when employed as fiducial markers. This is in part because such markers can be hard to detect in a large field of view or at large viewing distances due to perspective distortion or atmospheric scattering for example. These markers are further limited to a relatively small detection range to ensure proper detection and decoding of the marker's information payload.

Examples of fiducial markers used in augmented reality applications are ARToolKit™ and ARTag™ markers which are illustrated in FIG. 1c and FIG. 1d, respectively. Theses markers are made of black and white (or bi-tonal) square or geometric patterns, which encode information payload such as multi-bit data.

In deteriorated viewing conditions (i.e. Large viewing distances, camera noise, environmental or other factors) the geometrical pattern of these markers eventually becomes ambiguous and although their landmark is possibly still observable, their information payload is either extractable only with great difficult or not at all.

SUMMARY OF THE INVENTION

There is described herein a synthetic marker (also referred to as a tag or target) having optional fiducial properties to better detect position and orientation of the marker. The design of the synthetic marker is based on an encoding of an information payload, such as a bit sequence. The information payload is encoded using a spectrum which is dependent on a reading distance, a feature scaling or a resolution of an image of the marker. The reading distance is the distance between the marker and a detecting device. In this way, an amount (or a portion) of the information payload recoverable from the image of the marker depends on the reading distance, the feature scaling or the available resolution of the image taken.

In accordance with an embodiment, there is provided a method of producing a synthetic marker encoding an information payload, the method comprising: providing a representation of the information payload along a spectrum, the information payload comprising bits having respective priority levels ranging from high to low assigned thereto, bits having lower priority levels being encoded along an end of the spectrum which is successively lost with progressively degrading marker viewing conditions compared to bits having higher priority levels; mapping the representation into a spatial domain to pixel intensities; and, constructing a spatial pattern from the representation mapped in the spatial domain to produce the synthetic marker which contains the information payload.

In accordance with another embodiment, there is provided a synthetic marker encoding data, the synthetic marker comprising an information payload represented by bits encoded along a spectrum, each of said bits having a priority level assigned thereto ranging from high to low, bits having lower priority levels being encoded, along an end of the spectrum which is successively lost with progressively degrading marker viewing conditions compared to bits having higher priority levels.

In accordance with yet another embodiment, there is provided a method for detecting a synthetic marker encoding an information payload, the method comprising: capturing an image of said synthetic marker using an image acquisition device; and extracting from said image at least a portion of the information payload, the information payload comprising data bits encoded along a spectrum, wherein the portion extracted is dependent on a viewing condition of the image, a successive degradation in the viewing condition of the image resulting in a successive loss of the data bits having successively lower priority levels assigned thereto.

Still in accordance with yet another embodiment, there is provided a system for encoding data to produce a synthetic marker, the system comprising: a processing unit; a database coupled to the processing unit for storing the data; and an application coupled to the processing unit. The application being configured for: providing a representation of the information payload along a spectrum, the information payload comprising bits having respective priority levels ranging from high to low assigned thereto, bits having lower priority levels being encoded along an end of the spectrum which is successively lost with progressively degrading marker viewing conditions compared to bits having higher priority levels; mapping the representation into a spatial domain to pixel intensities; and constructing a spatial pattern from the representation mapped in the spatial domain to produce the synthetic marker which contains the information payload.

Still in accordance with yet another embodiment, there is provided a system for detecting a synthetic marker encoding an information payload, the system comprising: an image acquisition device for capturing an image of said synthetic marker; a processing unit coupled to the image acquisition device; and an application coupled to the processing unit. The application configured for: accessing the image captured by the image acquisition device; and extracting from said image at least a portion of the information payload, the information payload comprising data bits encoded along a spectrum, wherein the portion extracted is dependent on a viewing condition of the image, a successive degradation in the viewing condition of the image resulting in a successive loss of the data bits having successively lower priority levels assigned thereto.

The spectrum used can be continuous or non-continuous, frequency based or not, such as an amplitude spectrum of any type of transform which ensures that as the marker is viewed with increasing reading distance or diminishing resolution, its recoverable information payload degrades gracefully or in a proportionally decreasing fashion with diminishing resolution of increasing reading distance. Examples of transforms include, but are not limited to, frequency transforms such as the Fourier transform and the Wavelet transform.

The term "spectrum" referred to in the present specification is therefore intended to refer to a resolution-dependent symbol, or to any data encoding means for which the marker's recoverable information payload degrades gracefully and proportionally with diminishing detection or viewing conditions. Hence, "spectrum" can also refer to symbols of various sizes and/or different colored or non-colored features, less visible features being successively lost compared to more visible ones. This allows for the recoverable information payload to vary according to the viewing condition. Other similar encoding schemes are also possible.

The term "viewing condition" in the present specification, refers to conditions under which a synthetic marker is detected. A viewing condition can be, for example, a reading distance (i.e. a distance between an image acquisition device and the marker). The viewing condition can also be a resolution of an image taken by the image acquisition device to detect the marker. As image resolution is also tied to a scaling of features on the image, the viewing condition may also relate to a number of pixels available for a given feature on the image (i.e. pixel resolution).

In this specification, the term "Fourier tag" is intended to refer to a synthetic marker or pattern, decodable using any imaging device, wherein Fourier transforms are used to decode the information encoded therein. It should be understood that while the present description addresses specifically the use of Fourier transforms, other types of resolution-dependent transformations, including alternative frequency transforms are possible. For example, such a synthetic marker can be formed, using wavelets instead, of Fourier transforms. The encoding and detecting/decoding systems and methods used with such synthetic markers can be adapted, to function with the transforms used to build the markers. Other alternatives to the transforms and wavelets proposed herein can be used, as recognizable by a person skilled in the art.

BRIEF DESCRIPTION OF THE DRAWINGS

Further features and advantages of the present invention will become apparent from the following detailed, description, taken in combination with the appended drawings, in which:

FIG. 7a is an image of the Fourier tag of FIG. 2c taken at a reading distance larger than the reading distance at which FIG. 6a is taken;

FIG. 7b is an area of the image of FIG. 7a representing the Fourier tag in accordance with a second more degraded image resolution;

It will be noted that throughout the appended drawings, like features are identified by like reference numerals.

DETAILED DESCRIPTION

In order to be used as fiducial markers, synthetic markers are designed to be detectable. If the markers are further used to carry an information payload, the markers are also designed to be decodable such that the digital data encoded in the marker can be recovered.

The information payload encoded in a synthetic marker can be any bit stream representing information. This information is decoded from the marker's label and depends on the particular application for which the marker is used.

For example, a synthetic marker used in robotics or virtual reality to provide readily detectable labels on objects (i.e. a fiducial marker) can encode instructions to be used by a computer device, such as a stop, a start, a forward, a backward instruction, or any other instruction recognizable by a computer device. Synthetic markers can also used as reference markers in computer-aided surgery (CAS) systems to provide position and orientation information relative to a tool being used intra-operatively. Other applications of synthetic markers include various media applications, such as advertisement on buildings or billboards to be read by cameras on cellular telephones. Synthetic markers can also be used in the food and retail industry, on grocery coupons or on item's packaging or wrapping, to provide promotional information or nutritional information for example.

Synthetic markers carrying information payload are used with a system which can be decomposed into various devices each implementing a phase of an operational chain comprising: 1) the design and synthesis (i.e. production) of the marker itself, 2) the detection and extraction of the marker from an image, and 3) the decoding of the information payload from the image.

Figure 1A:
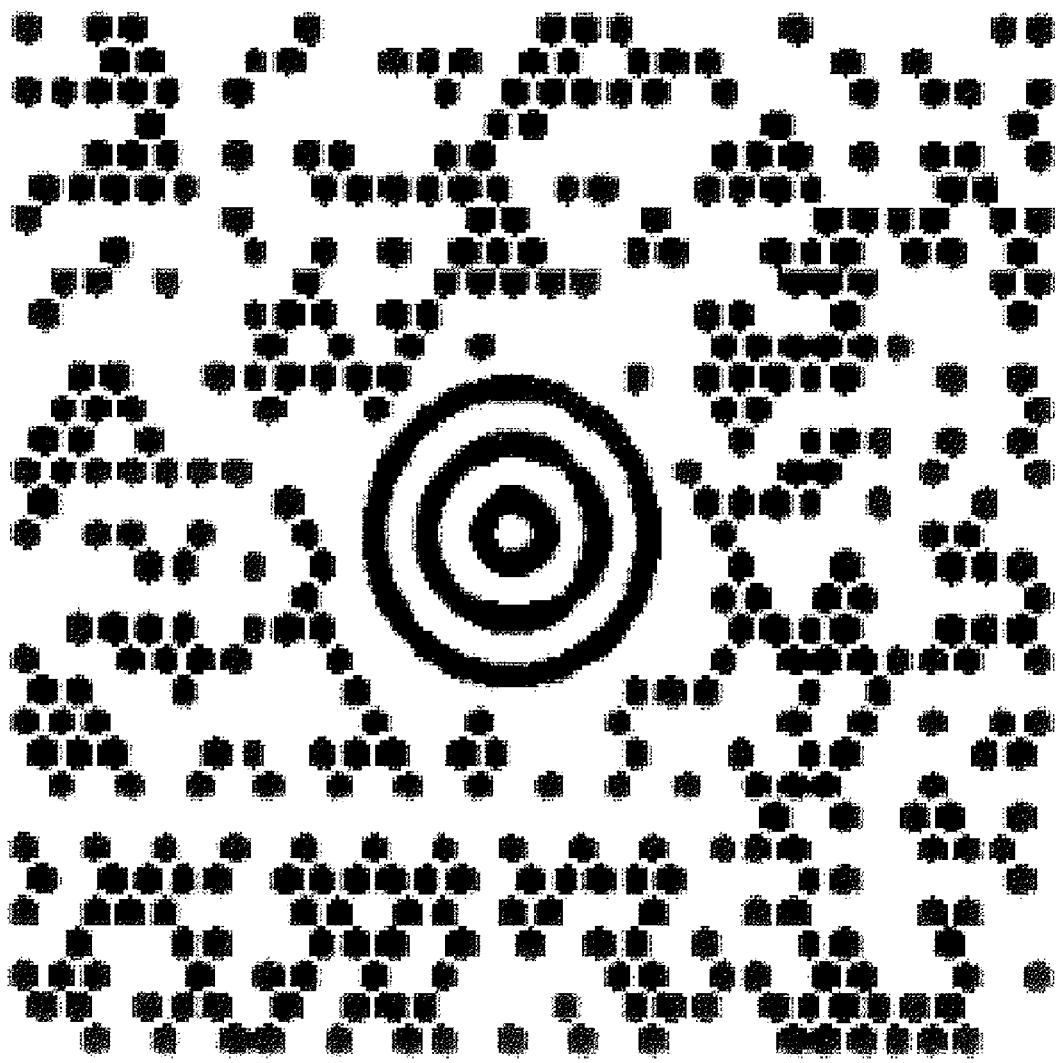
FIG. 1a is a synthetic marker in accordance with the prior art
Figure 1B:
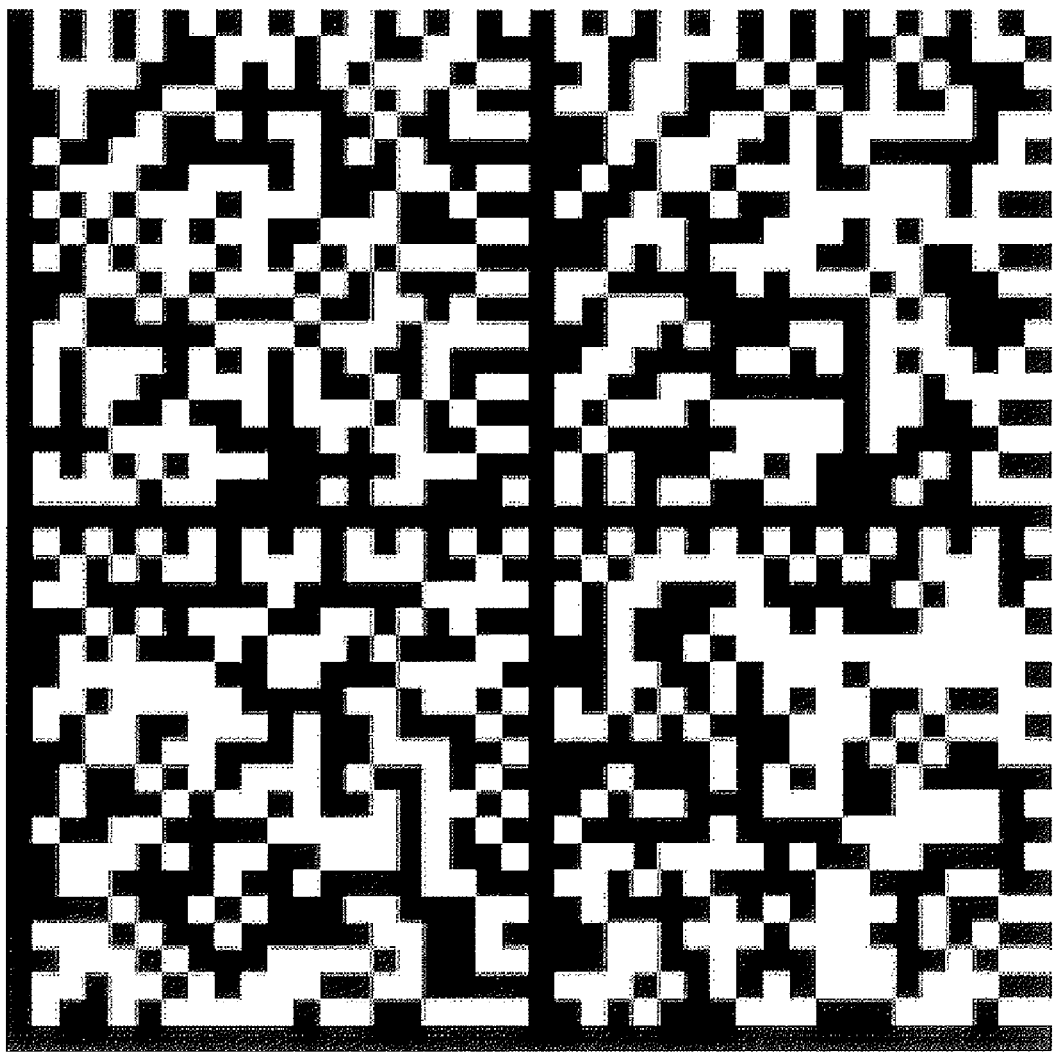
FIG. 1b is a synthetic marker in accordance with the prior art
Figure 1C:
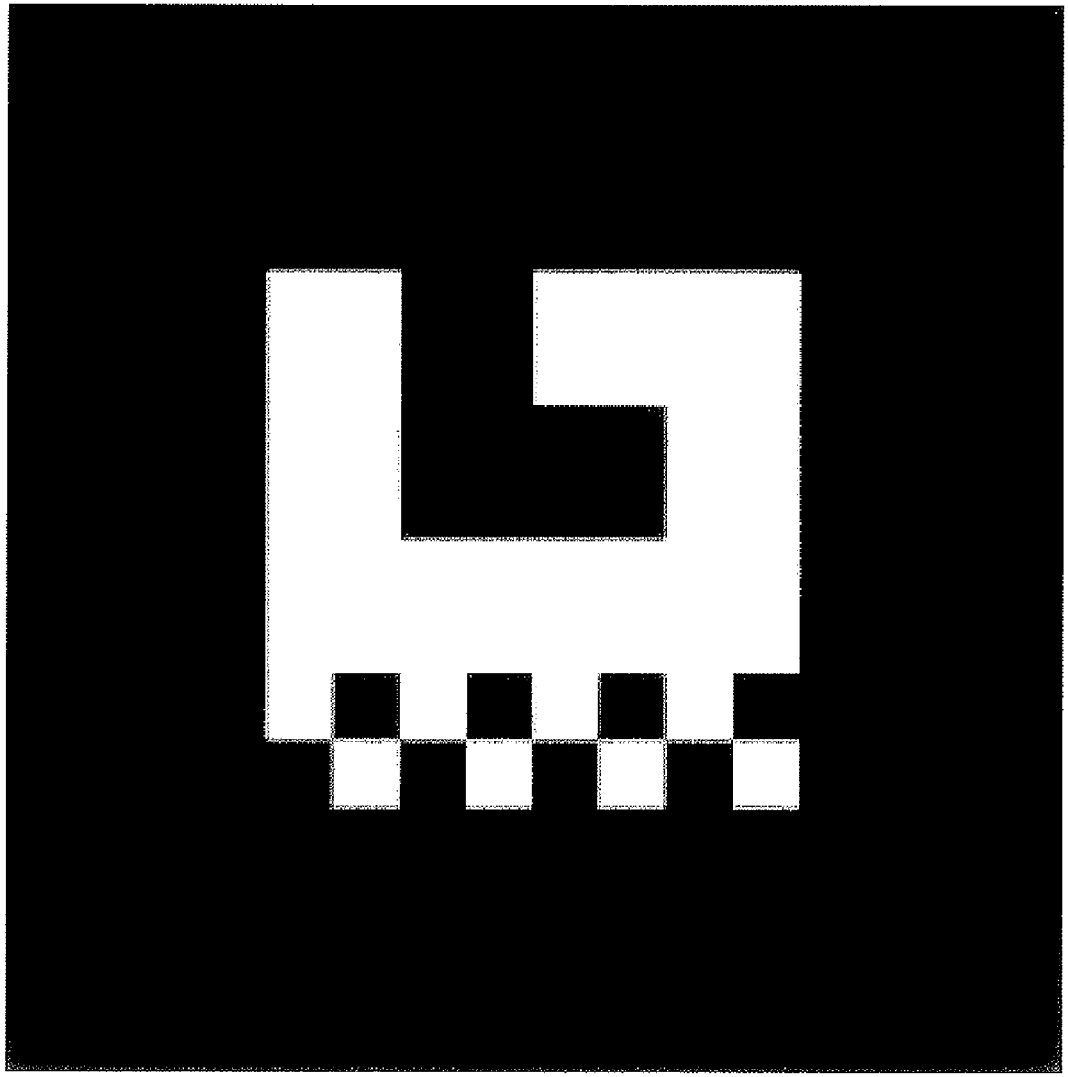
FIG. 1c is a synthetic marker used as a fiducial marker, in accordance with the prior art
Figure 1D:
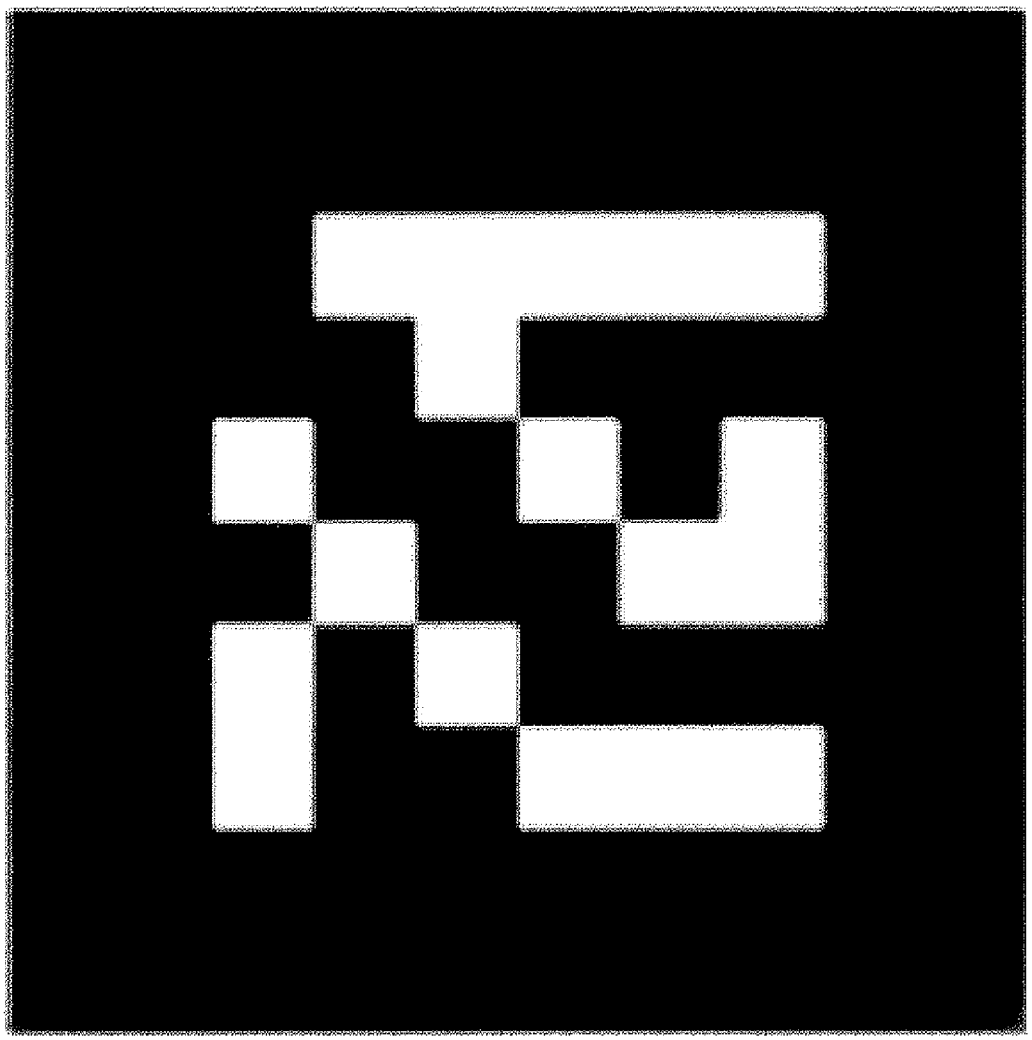
FIG. 1d is a synthetic marker used as a fiducial marker, in accordance with the prior art.
Figure 2A:
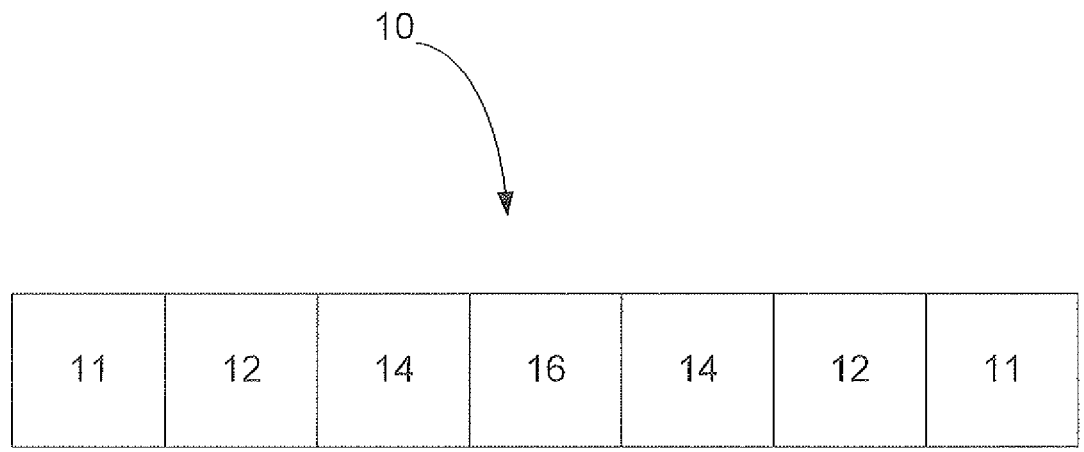
FIG. 2a is a schematic illustration of a synthetic marker in accordance with an embodiment of the invention.

FIG. 2a is a schematic illustration of a synthetic marker 10 formed from a row of varying pixel intensities 11-16 which encode a particular information payload.

Figure 2B:
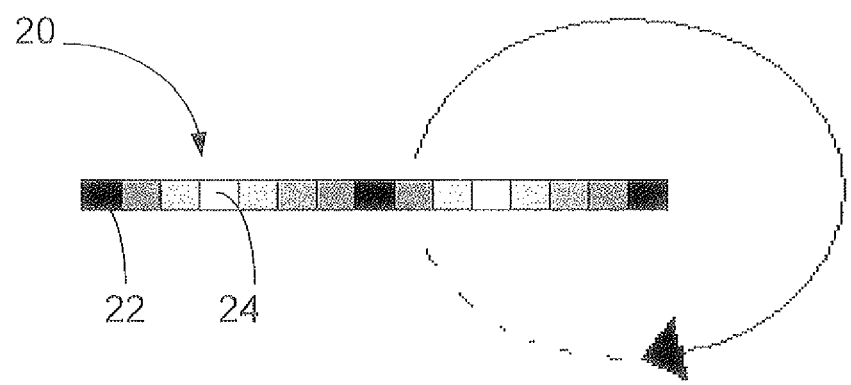
FIG. 2b is a schematic illustration demonstrating a formation of a circular synthetic marker by rotating the synthetic marker of FIG. 2a about a pivot point on the marker.

FIG. 2b is a schematic illustration demonstrating a formation of a circular synthetic marker from the rotation of a ray 20 of varying pixel intensities about a point on the ray 20. The pixels 22 and 24 contrast in intensity such that a darker pixel intensity corresponds to highly important data in the information payload in contrast with a lighter pixel intensity.

Figure 2C:
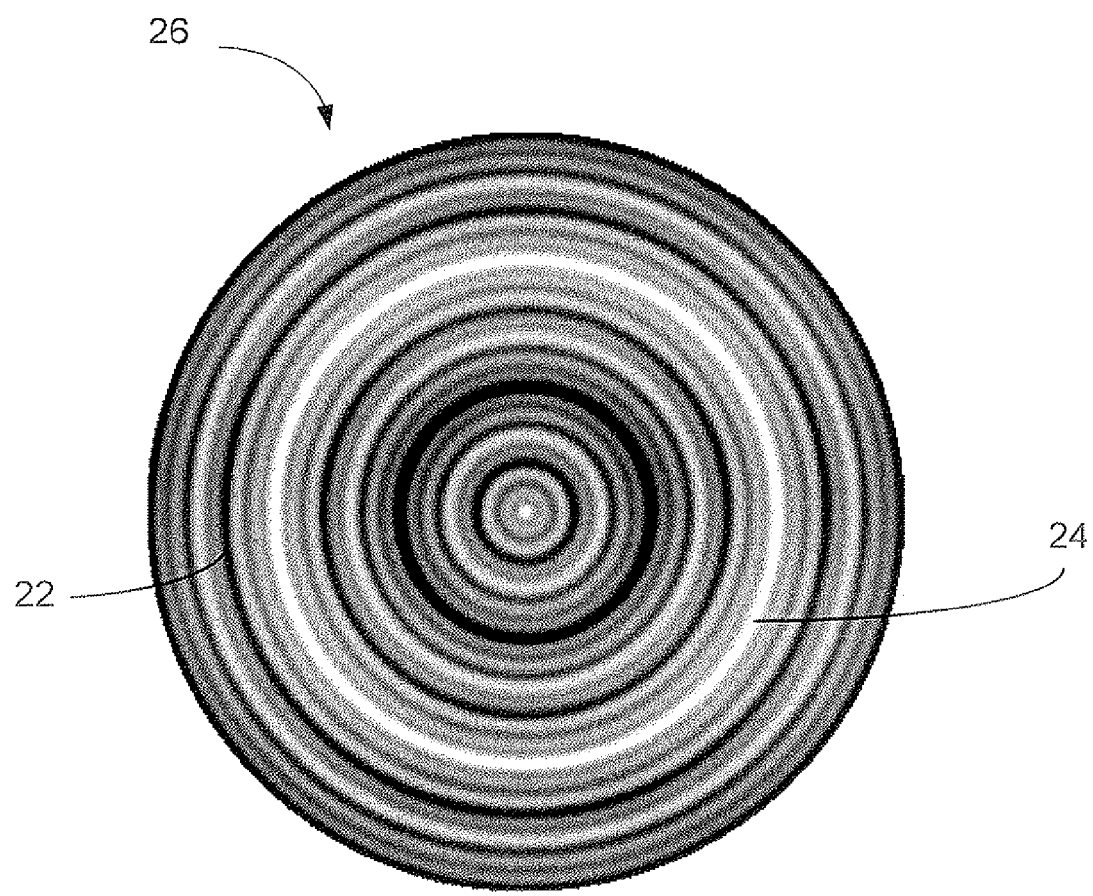
FIG. 2c is a particular example of a circular synthetic marker also referred to as a Fourier tag having the number 210 as information payload, in accordance with an embodiment of the invention.

FIG. 2c illustrates the circular synthetic marker 26 resulting from the rotation of the ray 20. Such a marker 26 is referred to as a Fourier tag.

Figure 3A:
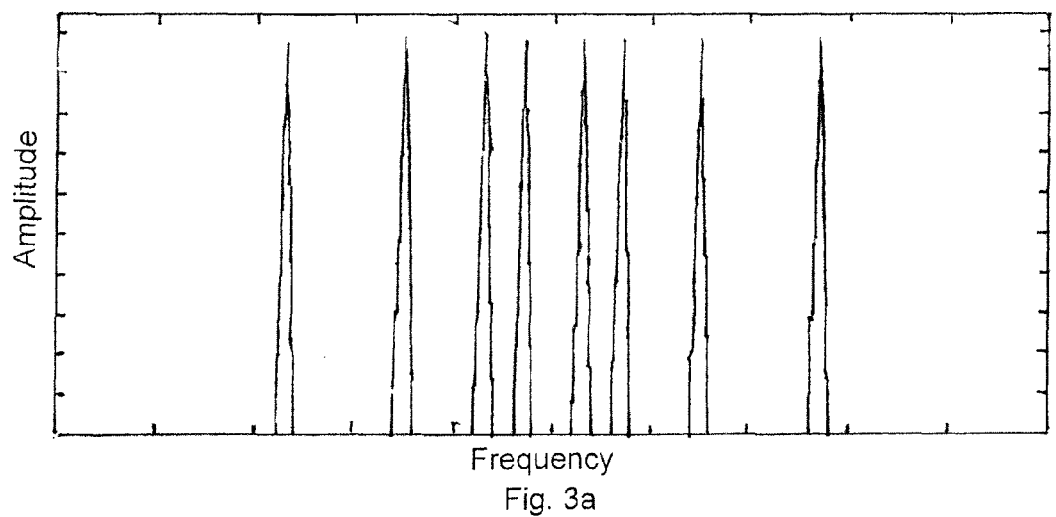
FIG. 3a is a graph showing a binary representation of the number 210 in the frequency domain, as used to produce the circular synthetic marker of FIG. 2c.
Figure 3B:
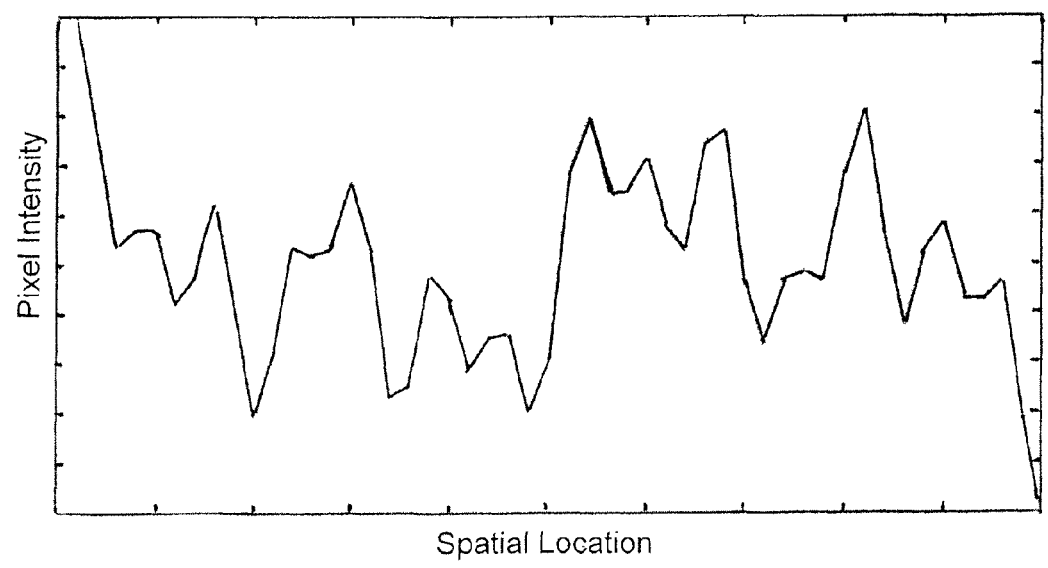
FIG. 3b is a graph showing the binary representation of FIG. 3a mapped in the spatial domain, as used, to produce the circular synthetic marker of FIG. 2c.

As an example, the Fourier tag 26 illustrated in FIG. 2c encodes the bit sequence 11010010, or the number 210. The tag 26 is formed from a binary representation of the number 210 along the frequency spectrum, as shown in FIG. 3a, as well as the spatial mapping to pixel intensity as illustrated in FIG. 3b. The most significant bit of the sequence is encoded in the lowest frequency ($f_1$), and conversely the least significant bit is encoded in the highest frequency ($f_8$).

The information payload of the Fourier tag 26 is encoded using a combination of circular harmonically-related functions with zero phase. It is encoded such that upon its detection, the information extracted degenerates gracefully with decreasing resolution of an image of the tag 26. As a distance between an imaging device such as a camera to a position of the tag 26 (i.e. reading distance) increases and the tag 26 becomes less and less resolvable, the number of data bits of the information payload that can be extracted from the tag 26 gradually decreases. When the tag 26 remains detectable but its information payload is no longer accessible, the gracefully degraded information payload can be sufficient for some tasks. For example, such degraded information payload may be used by a robotic system in order to determine if a tag 26 should be approached or not in order to obtain more complete information.

Still referring to FIG. 2c, in order for the information payload extracted from the tag 26 to degenerate gracefully with decreasing resolution of an image of the tag 26, the bits of the information payload are encoded along a spectrum, herein described as a frequency spectrum. Other spectrums can be used, such as various forms of the Wavelet transform, or even geometric elements of varying physical size. In addition, successively lower priority data (also referred to as lower order bits) are encoded using successively higher frequencies. In other words, low priority data is encoded using frequencies at a higher end of the spectrum, whereas high priority data (also referred to as higher order bits or data having a higher priority data the low priority data) is encoded using frequencies at a lower end of the spectrum.

In this manner, when the marker is only partly recognized (i.e. due to low image resolution or an occluded view of the marker), the higher priority data is preserved while the low priority data decay away successively.

The process of detecting and decoding the marker can be approximated by a low pass filtering transformation of an image of the marker. A low pass filtering transformation in turn results in a selective loss of the low order bits encoded in the marker. This selective loss (or low pass filtering effect) varies with a reading distance, a feature scaling on the image or a resolution of the image.

Loss in image resolution generally result from a combination of factors, including an increasing reading distance, which in turn can cause by perspective foreshortening and atmospheric scattering for example. An increasing reading distance tends to diminish the scaling on the image (i.e. less pixels in a feature), which in turn results in lower image resolution. Hence, the effects of loss of detail, loss of resolution and loss of fidelity when detecting a marker are approximated using a low pass filtering effect, which is taken into account in the encoding of the information payload to produce the marker.

Alternatively to the above, in cases where the detection and decoding process can be approximated by a high pass filtering transformation, the higher priority data is encoded at a higher end of the spectrum to ensure a similar graceful, degradation of the available information payload with decreasing resolution (or increasing reading distance). Examples of such high-filtering approximations may occur due to some forms of data transmission or encoding processes such as the discrete cosine transform used in JPEG image compression schemes.

A Fourier tag such as circular synthetic marker 26 tends to increase the ease of detection due to the rotationally symmetric pattern of the marker. The Fourier tag 26 can be used to make position estimates using simple image processing algorithms and allows for its detection even when partially occluded. Circular symmetry is however entirely optional and numerous other shapes and patterns can be used to construct a synthetic marker.

Figure 4:
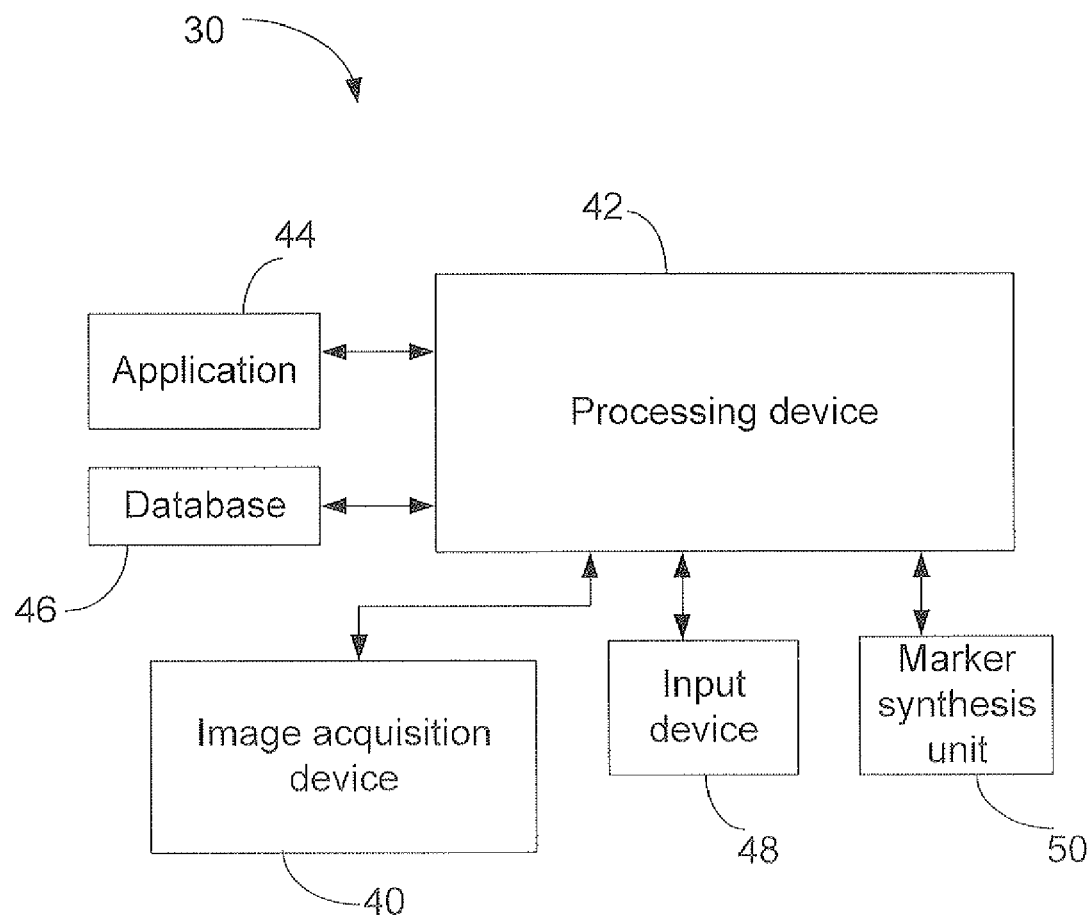
FIG. 4 is a schematic illustration of a system for detecting and decoding a synthetic marker in accordance with an embodiment of the invention.

FIG. 4 illustrates a schematic embodiment of a system 30 for producing a synthetic marker. The system 30 is also suitable for extracting and decoding a synthetic marker as herein described.

The system 30 has a image acquisition device 40, a processing device 42, an application 44 and a database 46, as well as an optional input device 48 and a marker synthesis unit 50.

The image acquisition unit 40 acquires an image containing the marker. The image acquired is then transferred to the processing device 42 for analysis. The database 46 can used to store the image or any other pertinent data useful to the synthesis, detection or decoding processes.

The processing device 42 is coupled to the image acquisition device 40, the application 44, the database 46, the input device 48 and the marker synthesis unit 50. The processing device 42 detects and decodes the marker from the image received. The application 44 is configured to perform all the steps in the synthesis and/or detection and decoding of a marker, as further detailed hereinbelow. For example, in order to decode the information payload of a marker, the application 44 has a suitable image processing algorithm.

The image acquisition device 40 is optional when the system 10 is used solely for synthesizing a marker.

In another embodiment, it is the marker synthesis unit 50 which becomes optional when the system 30 is used solely for detecting the marker. In this embodiment, the system 30 can be any scanning device or handheld device such as a cellular telephone, a personal digital assistant (pda) or any other processing device having image acquisition and capabilities.

Figure 5A:
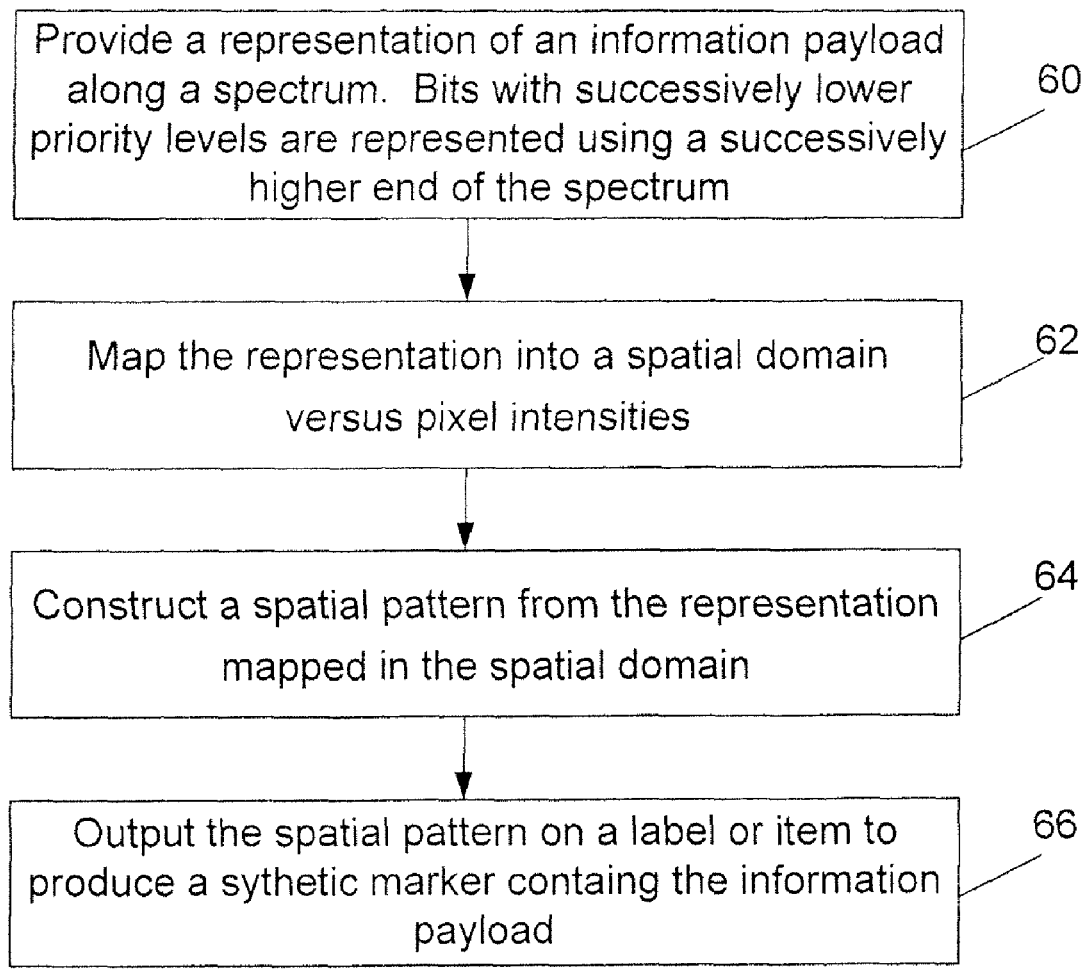
FIG. 5a is a flow chart of a method for encoding a synthetic marker in accordance with an embodiment of the invention.

Now referring to FIG. 5a, there is described an embodiment; of a method for producing a synthetic marker. The present method is adaptable to an end-user's particular application.

In the first step, step 60, the data to be carried by the marker is given a representation along a spectrum herein illustrated as a frequency spectrum. The representation can be any type of mathematical or symbolic representation such as binary, tertiary, or according to any other suitable base. The representation is provided such that a low priority data to be carried by the marker is represented using a higher end of the spectrum (herein illustrated as frequency signals in the higher end of the frequency spectrum). High priority data, on the other hand, or data having a higher priority data the low priority data, is represented using a lower end of the spectrum (herein illustrated as frequency signals located in a lower end of the frequency spectrum).

A particular example of step 60 first involves encoding the data to be carried by the marker by synthesizing a discrete periodic function using spectral coefficients $X(e^{j\omega})$.

For example, the numeral 210 can be; given the binary representation as seen in FIG. 3a. For simplicity, in this example, the digital data forming the information payload is represented as a binary encoding of evenly spaced, low-frequency signal bursts, slightly displaced from the DC component.

In step 62 of FIG. 5a, the representation provided in step 60 is mapped into a spatial domain to pixel intensities.

For example, each low-frequency coefficient in the binary representation of numeral 210 as illustrated in FIG. 3a, corresponds to the amplitude and the phase of complex exponentials of harmonically-related frequencies present in the spatial domain. In accordance with the familiar formula-pair for the discrete-time Fourier transform:

$$x[n] = \frac{1}{2\pi} \int_{2\pi} x(e^{jw}) e^{jw} dw \quad (1)$$

$$X e^{jw} = \sum_{n=-\infty}^{+\infty} x n e^{-jwn} \quad (2)$$

where x[n] is a discrete aperiodic function, and $X(e^{j\omega})$ is periodic with length $2\pi$. Equation (1) is referred to as the synthesis equation, while Equation (2) is referred to as the analysis equation where $X(e^{j\omega})$ is often called the spectrum of x[n].

Other encoding schemes can however be used. In the present example, the phase information is not encoded, and therefore the $X(e^{j\omega})$ are purely real. In other examples, the phase information can be encoded. When the phase information is not encoded, only one of the sines and cosines are used to encode the information, whereas both sines and cosines used when the phase information is encoded. While encoding the phase information tends to result in a more efficient encoding scheme, not encoding phase information tends to simplify the decoding of the marker. This is because the decoding of the phase information involves the time-consuming task of detecting an absolute phase of the signal.

The encoding scheme herein exemplified is a form of On/Off keying (OOK) modulation, where the information is stored, in the presence or absence of a carrier signal. This encoding scheme has the advantage of being fast and inexpensive to decode. Other modulation techniques can be used, such as phase modulation, amplitude modulation or vector quantization.

Still referring to step 62 of FIG. 5a, in order to map the binary representation in the spatial, domain to pixel intensities, the signal in the spatial domain is also ensured to be purely real. This property can be established by constructing an even (symmetric) function, in the frequency domain by mirroring $X(e^{j\omega})$, since an even, real signal in the frequency domain corresponds to an even, real signal in the spatial domain. This signal in the spatial domain is thus obtained by using the fast Fourier transform (FFT). FIG. 3b illustrates an example of such a signal which corresponds to the binary representation of FIG. 3a mapped in the spatial domain to pixel intensities.

In step 64 of FIG. 5a, a spatial pattern is constructed from the representation mapped in the spatial domain. This construction produces the synthetic marker.

In order to produce an arbitrary resolution digital image of the marker for further printing and labeling, the signal x[n] (i.e. the binary representation resulting from step 60) is sampled to produce a ray 20 of pixels (refer to FIG. 2b). Each pixel intensity such as 22 and 24 (refer to FIG. 2b) corresponds to the signal's intensity profile. For practical reasons, the signal mapped in the spatial domain can be scaled to be within a given range of pixel values, and can be filtered to reduce aliasing effects.

The construction of the marker in step 64 optionally involves rotating the ray 20 (refer to FIG. 2b) from a given point on the ray 20 of pixels (also referred to as an origin) to form a circular marker (such as marker 26 in FIG. 2c). Due to the uniform discretization of the pixels, some pixels from the rotated ray may map to sub-pixel regions. Sub-pixel stratified sampling with multiple samples can be used in order to reduce aliasing effects.

Step 66 is optional and involves the printing of the synthetic marker on a label or item for use in a specific application. Alternatively, the construction step 64 can simply be performed and the pattern of the marker recorded in a synthesis unit such as unit 30 (refer to FIG. 4) for later use.

The above method for producing a synthetic tag can be adapted to various encoding schemes. Error-correcting codes can also be used to produce the tag pattern. In one example, a larger information payload is provided in a single synthetic marker by using a mixture of signals with different phases to encode the payload in the phase offsets. This technique would however result in a more complex encoding and decoding process, as well as a more complex pixel pattern in the marker, which may have the effect of decreasing detectability of the tag.

The synthetic marker can also be constructed using colors. Color (or hue, or tone) information can be used as a spectrum to produce a similar marker for which the recoverable information payload varies with reading distance, feature scaling or resolution of the image. As an example, three single-colored markers are produced and placed one on top of each other to create a marker having various tones and colors. In addition to increasing the marker's detectability, different color channels can be used to encode additional information and thus increase the information payload density of the marker, as well as the marker's detectability. Attention should however be given to account for both illumination variations (and thus lack of color constancy), as well as printing variations that may make tag production more complicated.

Finally, the information payload density can also be increased by inserting data into the tag pattern as a spatial modulation. For example, additional fiducial properties can be added to the marker by placing a black dot somewhere on the marker such that an orientation can be determined. Other means for determining an orientation of the marker can be accomplished by embedding a circular symmetric marker such as shown in FIG. 2c in a non-symmetric background. Alternatively, the marker can have orientation information encoded using a non-symmetric harmonic (the difference between the x and the y component of the harmonic being indicative of some orientation for example). The data inserted into the tag pattern can also form error-correction means useful upon detection of the tag.

Figure 5B:
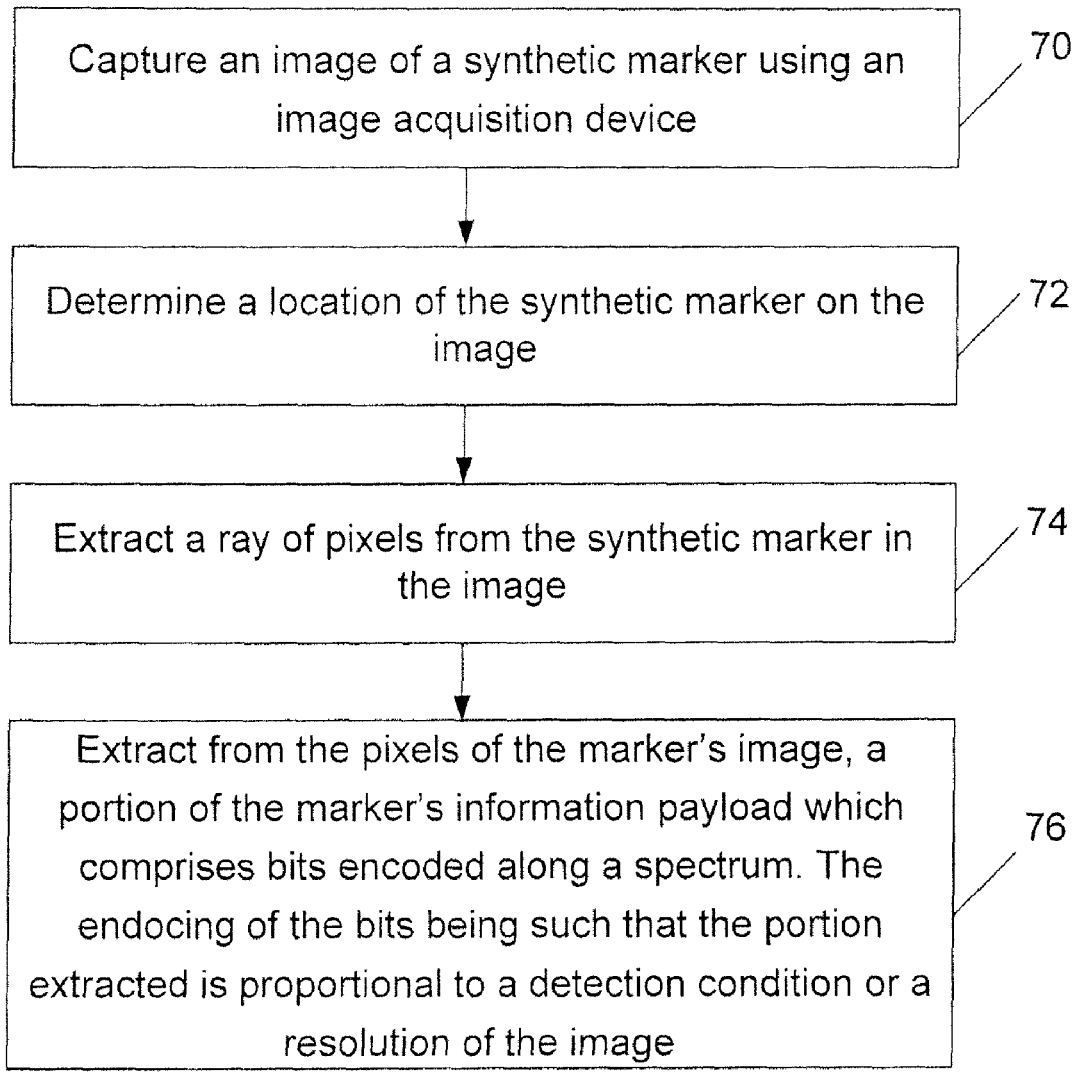
FIG. 5b is a flow chart of a method for detecting and decoding a synthetic; marker in accordance with an embodiment of the invention.

Now referring to FIG. 5b, there is described an embodiment of a method for detecting and decoding information payload from a synthetic marker.

In step 70, an image of a synthetic marker is acquired using any image acquisition device (such as device 40 in FIG. 4).

If the marker contain no color information, a gray scale image is sufficient.

In step 72, a location of the marker in the image is optionally determined. It is possible that perspective foreshortening effects cause some degree of shape distortion. The shapes formed by the markers however generally exhibit symmetry to some degree for circular symmetrical markers such as illustrated in FIG. 2c.

Finding the location of the marker on the image optionally comprises finding a center of a circular symmetric marker. This involves first reducing the noise by blurring the input grayscale image and then thresholding based, on the average intensity in the image. The image is then passed onto a region detector which finds the center of all circular regions or centroids. The centroid locator finds the center of the circular regions in the image, including the actual marker center. This step can return false positives which are mitigated using a second optional detection code as performed in step 74.

In step 74, a ray (or a line one pixel-thick) extending from a center of the marker to a periphery of the marker is optionally extracted from the image. This can be performed using the center of the circular marker as optionally determined in step 72.

As stated above, step 74 can be used to eliminate some false positives of step 72 which can occur on uniformly illuminated regions of the image. The width of the extracted ray depends on the symmetry of the surrounding region. The ray is grown in both directions starting from a potential center until pixels at both ends of the ray differ significantly in their intensity values, which indicates a break in symmetry. The difference between the maximum and minimum intensities along the line are calculated in the range of pixel intensities. If the threshold is below a preset level, the point is discarded as a potential tag center. Running this process on the set of possible tag centers provides a set of candidate rays used for decoding.

In step 76, the information payload of the marker, which corresponds to bits encoded along a spectrum within the marker, is extracted from the image of the marker. The portion (or the amount) of the information payload extracted is proportional to a resolution of the image.

Step 76 is done by determining at least an approximate location in the frequency domain for each bit in the information payload using encoding information. For example, the relative displacement from the DC component and the relative spacing between the signal bursts of the binary encoding of the information payload, as known from step 60 of the encoding method as illustrated in FIG. 5a, are used to determine the location of each bit in the information payload along the spectrum used for encoding the digital data.

If a ray was extracted in step 74, step 76 optionally involve first performing a Fourier transform on the ray extracted.

In step 76, the frequency responses in the local neighborhood of each bit is also optionally inspected to determine whether the key is On or Off (i.e. if a peak is detected at this location; referring to the above-described encoding method of FIG. 5a).

A number of factors may affect the decoding in step 76, some of which can be mitigated, while others remain intrinsic to the method.

For example, the type of imaging device used may affect the decoding process. Imaging devices using CCD or CMOS chips inherently add pixel noise to the captured images. This noise is dependent on the imaging cell itself, its temperature, as well as the equivalent ISO speed of the camera settings used. Such noise is often approximated as white noise.

In addition, depending on the surrounding environment luminance, the marker itself might be under or over-exposed, effectively reducing the dynamic range of the image. This, in turn, increases the quantization noise. This type of noise is sometimes approximated by white noise with a variance proportional to the step size used in the sampling of step 64 (refer to the encoding method illustrated in FIG. 5a).

Frequency leakage can also affect the decoding in step 76. Frequency leakage happens when the number of cycles of the sampled signal fitting inside the sampling window is not an integer number. The latter will cause jumps at intervals equal to the size of the sampling window, under the assumption that the signal is periodic. The jumps arise from the fact that the end of the sampled signal does not connect smoothly with its beginning. In the spectrum, this will show as smaller "echoes" of the main components. This will affect the frequency resolution of the system, that is, the minimum distance for which two different frequencies can be resolved, and will ultimately influence the minimum distance between the frequencies used to store bits. This problem can be alleviated by multiplying the sampling window with a function that tapers at both ends. Commonly used windows include the Bartlett, the Manning and the Parzen windows.

Underestimating the size of the marker can detrimentally affect the signal in a process similar to frequency leakage. This clipping of the marker blurs the spectrum and consequently reduces the frequency resolution of the system.

Overestimating the size of the marker introduces extra parts of the image inside the sampling window. If the intensity of this extra part is different than the average value of the marker, it will add low-frequency noise with roughly a 1/f distribution. This limits the ability to encode bits in the lower frequency area of the marker. This effect can be reduced by surrounding the marker with a grey value consistent with the average value of the marker, thus eliminating the abrupt change. For all purposes, illumination changes inside indoor environments will only add low-frequency noise.

Now referring to FIGS. 6a to 7d, there are provided two examples of the detection and decoding of a Fourier tag as shown in FIG. 2c for different viewing conditions. In these examples, a number of Fourier tags were printed on letter-sized paper and mounted on walls. Photographs were taken at various reading distances to replicate a robot moving in this environment and observing the Fourier tags from varying distances from the tag.

Figures 6A, 6B:
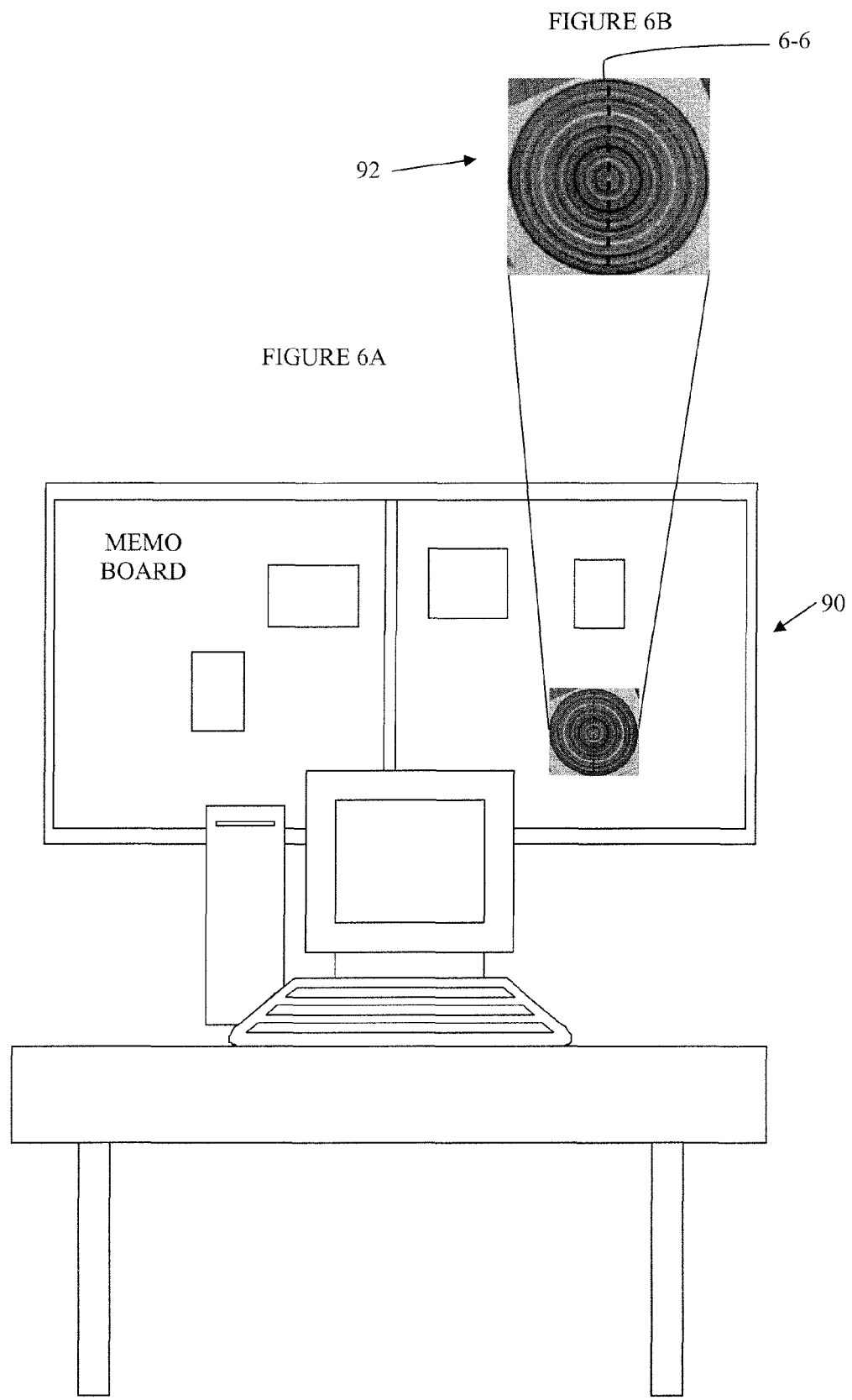
FIG. 6a is an image of the Fourier tag of FIG. 2c taken at a given reading distance.
FIG. 6b is an area of the image of FIG. 6a representing the Fourier tag in accordance with a first degraded image resolution.
Figure 8A:
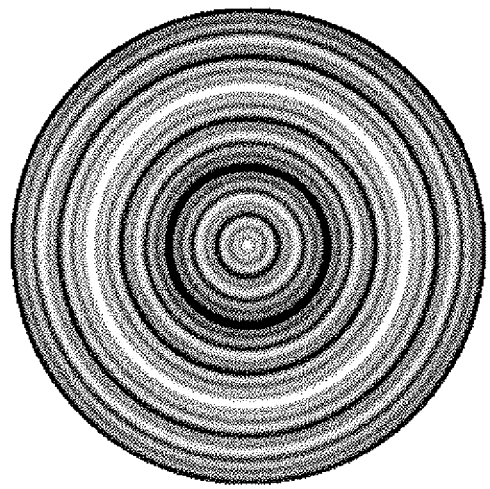
FIG. 8a is an original marker in the form of the Fourier tag of FIG. 2c.
Figure 8B:
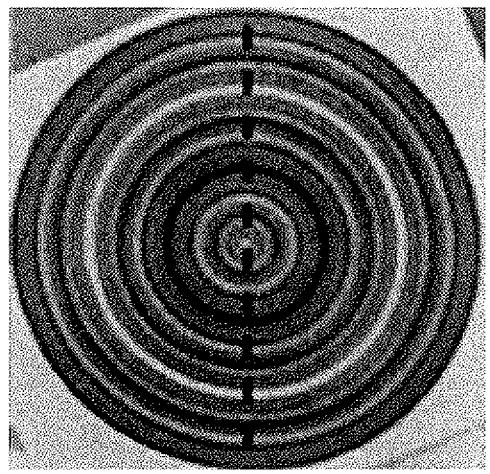
FIG. 8b is an image of the marker of FIG. 8a partially degraded.

FIG. 6a is a photograph of a scene comprising a Fourier tag. The photograph is taken from a relatively close reading distance of approximately 3 meters from the Fourier tag. The image taken is 2112 by 2816 pixels in size. FIG. 6b is an image of the Fourier tag as seen when cropped out of the photograph of FIG. 6a. FIG. 6b thus illustrates a degraded image of the Fourier tag as seen in FIG. 2c. The comparison in image resolution is made more evident from the side-by-side positioning of FIG. 8a with FIG. 8b.

Figure 6C:
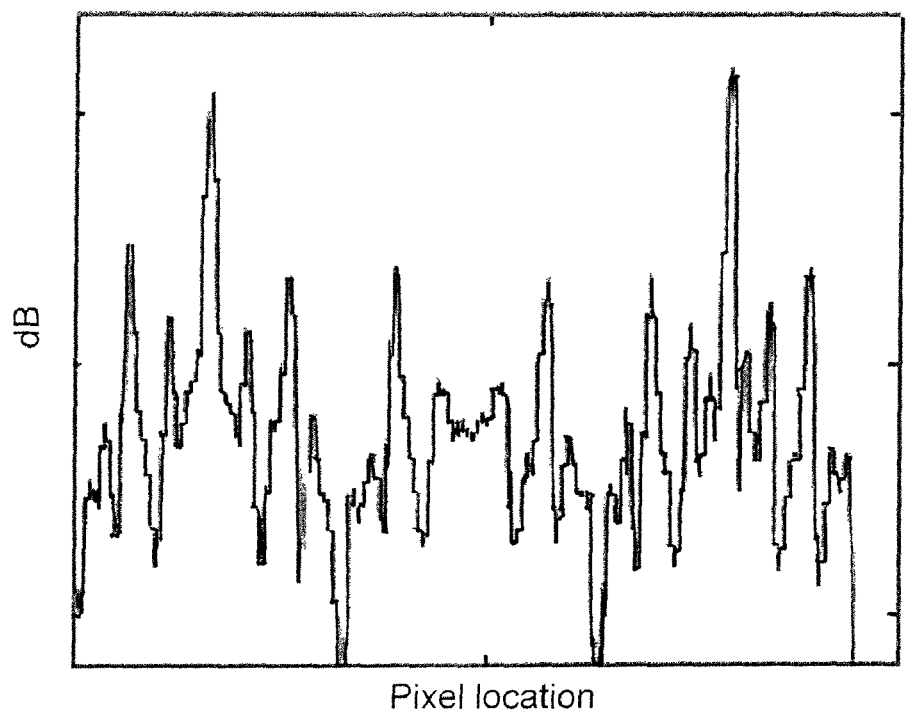
FIG. 6c shows a variation of pixel intensity versus a location across the dotted line of FIG. 6b.
Figure 6D:
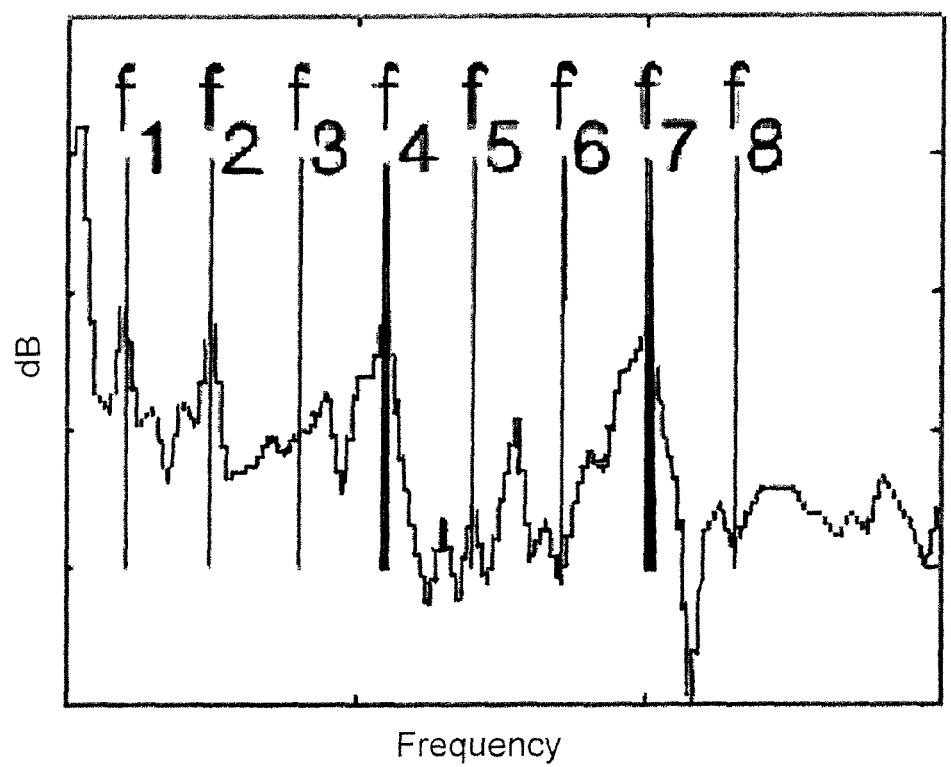
FIG. 6d shows an amplitude spectrum versus frequency taken across the dotted line of FIG. 6b.

The Fourier tag is first successfully located on the photograph of FIG. 6a, its location being identified in FIG. 6a by the black box framing the tag. As illustrated, in FIG. 6b, a line (or a ray) traversing the tag through its center is then extracted from the image. The information is then extracted; FIGS. 6c and 6d show the results obtained form the processing of the photograph of FIG. 6a. More specifically, FIG. 6c illustrates the variation in pixel intensity across a ray extract from the tag of FIG. 6b, along line 6-6. FIG. 6d illustrates the corresponding amplitude spectrum across the ray.

The locations of each bit 1 through 8 are finally obtained from the amplitude spectrum in FIG. 6d. The graph in FIG. 6d shows that the bits can be easily decoded, with a signal to noise ratio (SNR) appropriate for detection (in order of around 20 dB in the present example). The 1's are shown as peaks at $f_1$, $f_2$, $f_4$, and $f_7$ and the zeros at the other $f_n$ locations ($f_5$, $f_6$ and $f_8$).

Figures 7A, 7B:
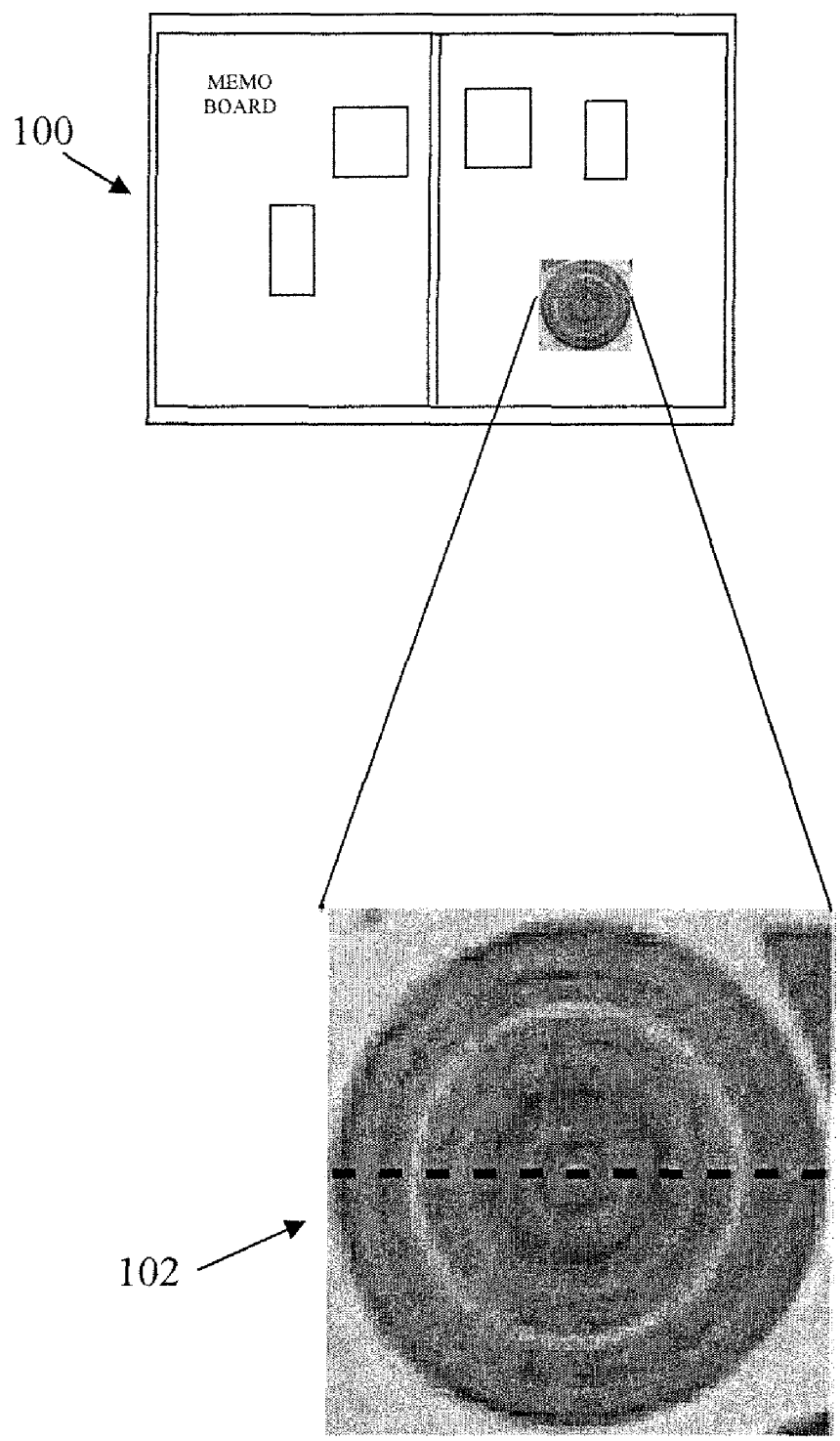
Figure 8C:
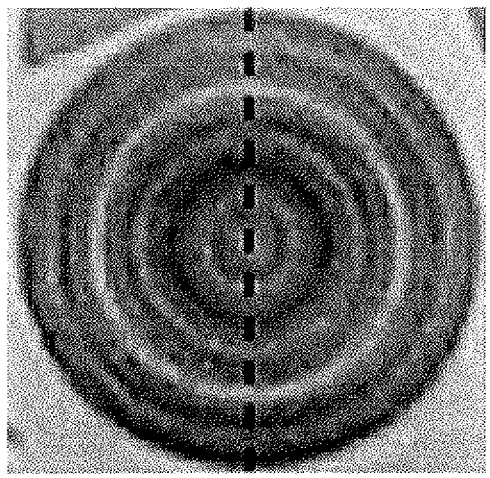
FIG. 8c is an image of the marker of FIG. 8a which is further degraded compared to FIG. 8b.

As the image acquisition device used to detect the tag is move further away, graceful degradation of the tag is observed to be proportionally degrading with the resolution of the tag image. FIG. 7a is a photograph of a tag taken at a greater reading distance than that of FIG. 6a. The photograph is also 2112 by 2816 pixels in size. The graceful degradation of the tag can be seen by the comparison of the cropped out tag image of FIG. 7b in comparison with the original Fourier tag of FIG. 2c and the partially degraded tag image of FIG. 6b. The graceful degradation of the Fourier tag with viewing conditions due to distance and image resolution is also illustrated by the comparison of the original tag in FIG. 8a, the partially degraded tag image of FIG. 8b taken under partially degraded viewing conditions, and the further degraded tag image of FIG. 8c taken under very poor viewing conditions.

Figure 7C:
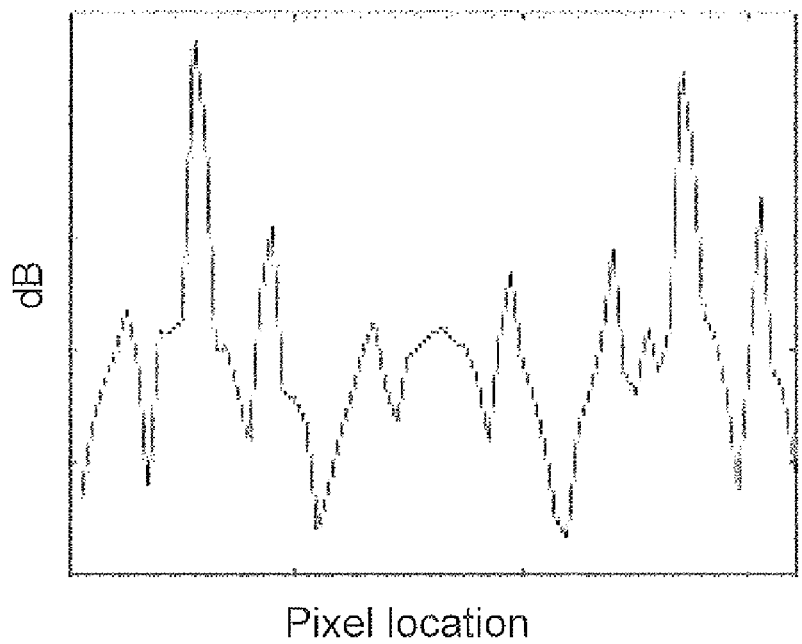
FIG. 7c shows a variation of pixel intensity versus a location across the dotted, line of FIG. 7b.
Figure 7D:
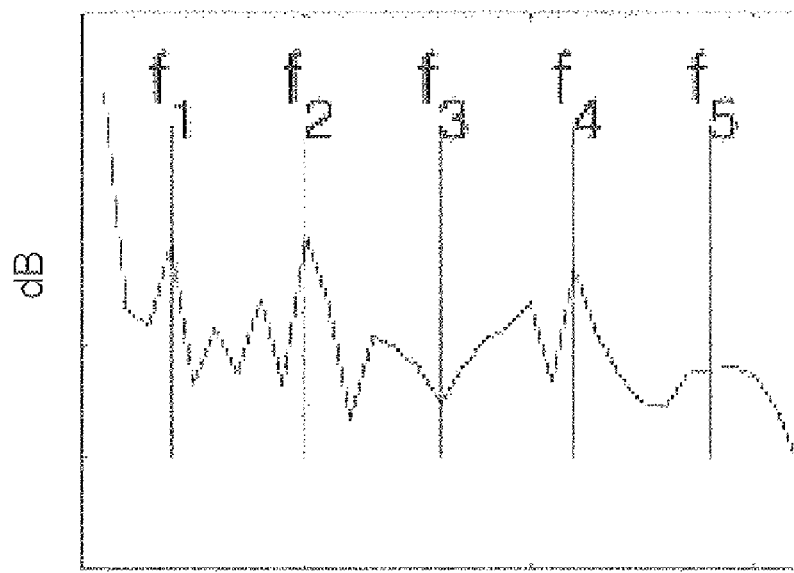
FIG. 7d shows an amplitude spectrum versus frequency taken across the dotted line of FIG. 7b.

The image of the tag in FIG. 7b shows that the highest frequencies have been filtered out by the optics of the imaging device due to diminished viewing conditions. The radius of the tag shown in FIG. 7b is 64 pixels in length and the frequencies f6 through $f_8$ can no longer be detected since these frequencies were all encoded at frequencies located above the Nyquist limit of 32, as illustrated from the decoding results in FIGS. 7c and 7d. FIGS. 7c and 7d respectively illustrate the variation in pixel intensity across a ray extract from the tag of FIG. 7b, along line 7-7 and the corresponding amplitude spectrum across that ray. As can be seen from the graphs, only the frequencies $f_1$ through $f_5$ remain detectable with an appropriate SNR.

While the design and encoding of the synthetic markers are described herein for use as fiducial landmarks, they can also be used for vision-based control of terrestrial vehicles or for interactive control. For example, the markers can be employed to directly facilitate human-robot interaction. In a more specific example, the markers are used underwater to allow a scuba diver to communicate with a swimming robot vehicle to indicate to the robot desired actions or behaviors. This is especially useful underwater since traditional human-robot interaction mechanisms such as speech and typing are not readily feasible in submerged conditions, and radio communication is generally impossible. Further, even traditional gesture-based interaction can be problematic since the cost of failures is high, feedback to verify the gestures is limited, and gestural vocabularies are typically small and error-prone. The herein described, markers, such as the Fourier tag exemplified in FIG. 2c, can be used as a visual communication language which combines robustness, expansive vocabulary, economy and simplicity.

The embodiments of the invention described above are intended to be exemplary only. The scope of the invention is therefore intended to be limited solely by the scope of the appended claims.

I claim:

1. A method of producing a synthetic marker encoding an information payload, the method comprising:
providing a representation of the information payload along a spectrum, the information payload comprising bits having respective priority levels ranging from high to low assigned thereto, bits having lower priority levels being encoded along an end of the spectrum which is successively lost with progressively degrading marker viewing conditions compared to bits having higher priority levels;
mapping the representation into a spatial domain to pixel intensities; and
constructing a spatial pattern from the representation mapped in the spatial domain to produce the synthetic marker which contains the information payload.

2. The method of claim 1, wherein the spectrum is a frequency spectrum and wherein the providing a representation comprises representing the bits having successively lower priority levels using successively higher frequencies in the frequency spectrum.

3. The method of claim 1, wherein the spectrum is a frequency spectrum and wherein the providing a representation comprises representing bits having successively higher priority levels using successively lower frequencies in the frequency spectrum.

4. The method of claim 1, wherein said constructing a spatial pattern comprises sampling the representation of the data to produce a row of pixels, the row of pixels defining the spatial pattern.

5. The method of claim 4, wherein said constructing a spatial pattern comprises rotating the row of pixels about a point on the row to produce a circular synthetic marker.

6. The method of claim 1, wherein the providing a representation comprises synthesizing a discrete periodic function.

7. The method of claim 1, wherein the providing a representation comprises encoding phase information.

8. The method of claim 1, wherein the providing a representation comprises using one of an On/Off keying (OOK) modulation, a phase modulation, an amplitude modulation or a vector quantization to represent the bits.

9. The method of claim 1, wherein the mapping comprises applying a fast Fourier transform (FFT) to the representation.

10. The method of claim 1, wherein the mapping comprises using pixel color to encode data into the synthetic marker.

11. The method of claim 1, wherein the constructing comprises scaling the mapping according to a given range of pixel intensities.

12. The method of claim 1, further comprising modulating the spatial pattern to add data into the synthetic marker.

13. A synthetic marker encoding data, the synthetic marker comprising an information payload represented by bits encoded along a spectrum, each of said bits having a priority level assigned thereto ranging from high to low, bits having lower priority levels being encoded along an end of the spectrum which is successively lost with progressively degrading marker viewing conditions compared to bits having higher priority levels.

14. The synthetic marker of claim 13, wherein the data is encoded using a frequency spectrum.

15. The synthetic marker of claim 13, wherein the synthetic marker has a shape defined by a rotation of a ray of pixels, the ray of pixels corresponding to the bits encoded along a frequency spectrum mapped into a spatial domain.

16. The synthetic marker of claim 13, wherein an amount of the information payload decoded upon detection of the synthetic marker is proportional to a resolution level of an image taken of the synthetic marker for the detection.

17. A method for detecting a synthetic marker encoding an information payload, the method comprising:
    capturing an image of said synthetic marker using an image acquisition device; and
    extracting from said image at least a portion of the information payload, the information payload comprising data bits encoded along a spectrum, wherein the portion extracted is dependent on a viewing condition of the image, a successive degradation in the viewing condition of the image resulting in a successive loss of the data bits having successively lower priority levels assigned thereto.

18. The method of claim 17, wherein the extracting comprises determining a location of the synthetic marker on the image and extracting a portion of the synthetic marker for analysis.

19. The method of claim 17, wherein the synthetic marker is a circular symmetric marker, and wherein the extracting comprises finding a center of the circular symmetric marker.

20. The method of claim 19, wherein the extracting further comprises:
    growing a ray in opposite directions from the center of the synthetic marker until an intensity value of two pixels each located at an end of the ray indicate a break in a symmetry of the circular symmetric marker; and
    extracting the ray from the image.

21. The method of claim 20, wherein the extracting the ray comprises performing a Fourier transform on the ray extracted.

22. The method of claim 17, wherein the extracting comprises determining a location of each one of the bits in the information payload along the spectrum based on parameters used for encoding the data into the synthetic marker.

23. A system for encoding data to produce a synthetic marker, the system comprising:
    a processing unit;
    a database coupled to the processing unit for storing the data; and
    an application coupled to the processing unit, the application being configured for:
    providing a representation of the information payload along a spectrum, the information payload comprising bits having respective priority levels ranging from high to low assigned thereto, bits having lower priority levels being encoded along an end of the spectrum which is successively lost with progressively degrading marker viewing conditions compared to bits having higher priority levels;
    mapping the representation into a spatial domain to pixel intensities; and
    constructing a spatial pattern from the representation mapped in the spatial domain to produce the synthetic marker which contains the information payload.

24. A system for detecting a synthetic marker encoding an information payload, tire system comprising:
    an image acquisition device for capturing an image of said synthetic marker;
    a processing unit coupled, to the image acquisition device; and
    an application coupled to the processing unit, the application configured for:
    accessing the image captured by the image acquisition device; and
    extracting from said image at least a portion of the information payload, the information payload comprising data bits encoded along a spectrum, wherein the portion extracted is dependent on a viewing condition of the image, a successive degradation in the viewing condition of the image resulting in a successive loss of the data bits having successively lower priority levels assigned thereto.

* * * * *